Oct. 17, 1961 C. L. WACHTEL 3,004,568
STAND FOR STUMP REMOVER
Filed Oct. 28, 1959
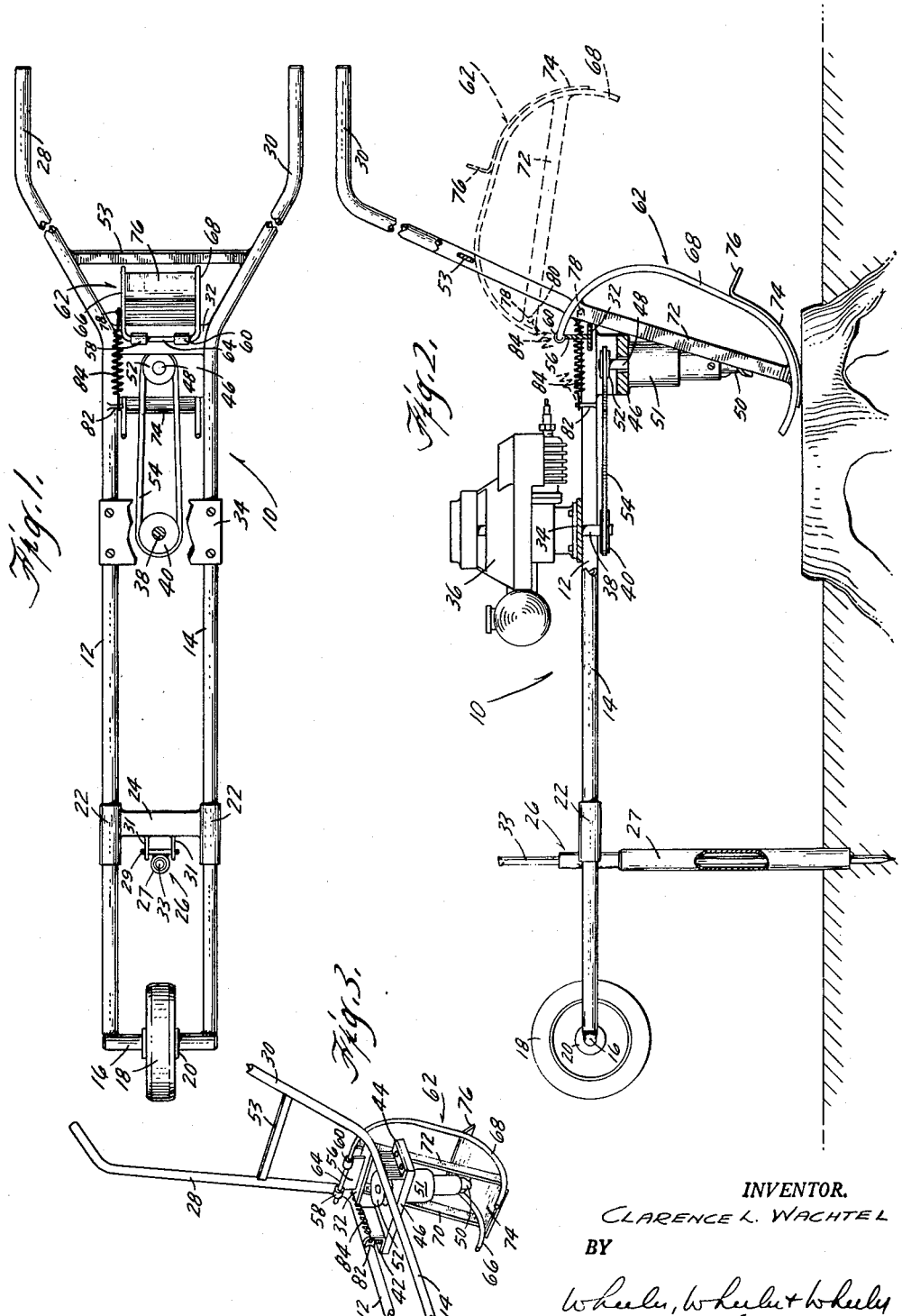
INVENTOR.
CLARENCE L. WACHTEL
BY
Wheeler, Wheeler + Wheeler
ATTORNEYS.

United States Patent Office 3,004,568
Patented Oct. 17, 1961

3,004,568
STAND FOR STUMP REMOVER
Clarence L. Wachtel, 611 Maywood Ave.,
Milwaukee, Wis.
Filed Oct. 28, 1959, Ser. No. 849,330
5 Claims. (Cl. 144—2)

This invention relates to tree stump removing apparatus and more particularly to a stand for such an apparatus.

In a tree stump remover such as the one disclosed in U.S. Patent #2,825,370, the tree stump is reduced by a power driven router which extends downwardly toward the ground from a frame which supports an engine and from which the routing tool depends. The router can be damaged if set against a rock or other hard material and the weight of the frame and engine imposed on the tool, whether or not it is in motion at the time. Damage could also be caused and possible injury to the operator precipitated by setting the router down while it is in motion. The router might hit objects with rotational force either damaging the router, throwing objects with which it comes in contact, or slewing the frame about its pivotal mounting.

The present invention includes a stand which can be pivoted to support the router above an underlying surface, thus to protect the router from damage whether or not it is in motion. The stand includes a skeletonized hood which surrounds the router preventing the operator from accidentally contacting the router. The stand of present invention is constructed to be retractable from the support position when the apparatus is to be used. Means are provided which maintain the stand in either position until it is shifted to the other position by the operator.

In the drawings:

FIG. 1 is a top view of a tree stump removing machine embodying the present invention;

FIG. 2 is a side elevation of the machine in FIG. 1 with portions broken away to illustrate details of the invention; and FIG. 3 is a perspective view of a portion of the machine shown in FIGS. 1 and 2.

A stump removing machine 10 is shown in the drawings as having parallel spaced side frame members 12 and 14. Members 12 and 14 are interconnected at one end by an axle 16. A wheel 18 is mounted on axle 16 and rotates about bearing 20. Wheel 18 is useful in rolling the machine between job sites. Machine frame 10 is slidably supported on a slide bracket which includes a pair of sleeves 22 which slidably receive members 12 and 14, and a cross brace 24 interconnecting said sleeves. The slide bracket is carried on an upright support assembly or mast 26 which desirably comprises a hollow stake 27 connected on the horizontal pivot axis of pin 29 to ears 31 welded to cross brace 24. Hollow stake 27 is embedded in the ground and is pinned in place by a pin 33 which provides a vertical axis on which the stake 27 can turn.

The ends of side frame members 12 and 14 remote from axle 16 are bent to diverge and form handles 28 and 30. A second cross brace 32 joins the frame members 12 and 14 at their points of divergence from parallel. Inter- mediate the length of machine frame 10 and between cross braces 32, 24 an engine mounting plate 34 spans members 12 and 14. A prime mover 36 is mounted on plate 34 and as shown in FIG. 2 desirably constitutes a small gasoline engine.

Prime mover 36 has a driveshaft 38 extending downwardly therefrom through plate 34. A pulley 40 is mounted on shaft 38, to be driven thereby. Mounting plate 34 and axle 16 define the limits between which members 12 and 14 can be slid on sleeves 22. The router tool 50 depends from a mounting including platform 46 attached on its side margins to frame members 12 and 14 adjacent cross brace 32 by angle iron supports 42 and 44. The router tool 50 is attached to the end of shaft 48 which is supported for rotation in bearing housing 51 which may be welded to the under surface of platform 46. Shaft 48 has at its upper end a pulley 52 in the same horizontal plane as pulley 40. A belt 54 interconnects pulley 40 and 52 to transfer power from prime mover 36 to router 50. The stand of the present invention comprises a skeleton hood 62 which includes an open frame work comprising bowed legs 66, 68 interconnected at one end by pintle rod 64 pivotally mounted within the knuckles 58, 60 of hinge leaf 56 welded on end to cross brace 32. A pair of support braces 70 and 72 brace the end portions of bowed legs 66 and 68 respectively maintaining the bowed shape of the frame. A curved guard plate 74 spans between bowed legs 66 and 68 adjacent the end of hood 62 remote from pintle rod 64. The bowed legs 66, 68, strap braces 72 and guard plate 74 form a semi-enclosure to receive the router tool 50 when the stand is swung to its full line position shown in FIG. 2 in which the braces 72 stop against the edge of cross brace 32. The stand may be pivoted to an out of the way position about pintle rod 64 when the router is in use. This is shown in dotted lines in FIG. 2. To yieldingly bias the stand to either position at the option of the operator, I provide an over-center bias spring 84 connected at one end to the stand on ear 78 which is welded to the support brace 70 and has a hole 80 to receive the end of the spring 84. The other end of the spring connects to ear 82 welded on frame member 12; accordingly the spring 84 swings over the center or axis of pintle rod 64 when the stand is moved between its respective positions. When in raised position the hood 62 stops against cross brace 53.

Guard plate 74 has a toe flange 76 by which the machine operator may manipulate the stand with his foot.

The skeletonized hood 62 not only is light in weight for ease in manipulation, but the operator can see through it to observe the routing tool 50. The spring 84 holds the hood impositively in either of two positions so that a definite force must be exerted by the operator to move the hood to its other position, this prevents the hood from accidentally raising or lowering at an undesirable time.

I claim:

1. The combination with a tree stump removing machine comprising a frame, ground support means at one end of the frame, a depending cutting tool and a tool control handle at the other end of the frame, of a stand, pivot means connecting said stand to the frame adjacent said tool and on which said stand is pivotable between a first position in which the cutting tool is supported by the stand above the level of the underlying surface and a second position exposing the tool for manipulation by said handle against a tree stump.

2. The device of claim 1 in which said stand comprises a hood having a skeletonized frame and within which said tool is received in said first position.

3. The combination of claim 2 in further combination with biasing means interconnecting said hood and said apparatus for impositively holding said hood selectively in either position.

4. The device of claim 2 in which said frame includes a pair of bowed legs, brace means spanning across the bowed legs and a guard plate interconnecting said legs.

5. The device of claim 4 in which said plate is provided with a kick flange whereby the hood may be manipulated between said first and second positions by the operator's foot.

References Cited in the file of this patent

UNITED STATES PATENTS

| | | |
|---|---|---|
| 1,417,425 | Thompson | May 23, 1922 |
| 2,418,601 | Richards | Apr. 8, 1947 |
| 2,825,370 | Fieber | Mar. 4, 1958 |
| 2,887,134 | Bartlett | May 19, 1959 |